United States Patent [19]

Drent

[11] Patent Number: 5,227,465

[45] Date of Patent: Jul. 13, 1993

[54] POLYKETONE POLYMER PREPARATION IN THE ABSENCE OF HYDROGEN

[75] Inventor: Eit Drent, Amsterdam, Netherlands

[73] Assignee: Shell Oil Company, Houston, Tex.

[21] Appl. No.: 906,647

[22] Filed: Jun. 30, 1992

[30] Foreign Application Priority Data

Jul. 8, 1991 [NL] Netherlands .......................... 9101189

[51] Int. Cl.⁵ .............................................. C08G 67/02
[52] U.S. Cl. .................................... 528/392; 525/539
[58] Field of Search ........................................... 528/392

[56] References Cited

U.S. PATENT DOCUMENTS 5,037,944  8/1991  Smaardijk et al. .................. 528/229
5,077,384  12/1991  Petrus et al. ........................ 528/392

FOREIGN PATENT DOCUMENTS 228733  7/1987  European Pat. Off. .

*Primary Examiner*—Harold D. Anderson
*Attorney, Agent, or Firm*—Denise Y. Wolfs

[57] ABSTRACT

A process for preparing low molecular weight polyketone polymers is described, wherein carbon monoxide is combined with ethene and/or propene and optionally in addition to one or more other α-olefins, by contacting the monomers in the absence of hydrogen with a catalyst containing a Group VIII metal and a tetra(sec-alkyl)bisphosphine ligand.

12 Claims, No Drawings

POLYKETONE POLYMER PREPARATION IN THE ABSENCE OF HYDROGEN

The invention relates to a process for the preparation of polymers of carbon monoxide with one or more α-olefins.

BACKGROUND OF THE INVENTION

Linear polymers of carbon monoxide and one or more α-olefins in which the monomer units from carbon monoxide and the monomer units from the olefins are present in an alternating arrangement can be prepared by contacting the monomers with a catalyst composition containing a Group VIII metal and a phosphorus bidentate ligand of the general formula

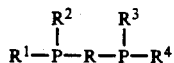

in which $R^1$, $R^2$, $R^3$, and $R^4$ each represent identical or different monovalent aromatic or aliphatic hydrocarbon groups and R is a divalent organic bridging group containing at least two carbon atoms in the bridge connecting the two phosphorus atoms to each other. Using these catalyst compositions, linear alternating polyketone polymers are obtained with an average molecular weight, calculated as number average ($\overline{M}_n$), of more than 10,000.

The polyketone polymers, or polyketones, have repeating units of the formula

wherein A is a unit derived from at least one olefinically unsaturated hydrocarbon. U.S. Pat. No. 4,880,903 (Van Broekhoven et al.), for example, discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal, the anion of a strong acid, and a bidentate ligand of phosphorus, nitrogen, or sulfur. U.S. Pat. No. 4,843,144 (Van Broekhoven et al.), for example, incorporated herein by reference, discloses a process for preparing polymers of carbon monoxide and at least one ethylenically unsaturated hydrocarbon using a catalyst comprising a compound of palladium, the anion of a nonhydrohalogenic acid having a pKa of below about 6 and a bidentate ligand of phosphorus.

For some applications there is a need for polyketone polymers with a considerably lower average molecular weight. These polymers can be used as such or can serve as starting material for the preparation of other valuable polymers by chemical modification. The carbonyl groups present in the polymers as functional groups can be converted by chemical reaction at least partly into a variety of other functional groups. This chemical modification changes the properties of the polymers and they become eligible for applications for which the original polymers were unsuitable or less suitable. Chemical reactions which can be applied to the low molecular weight polymers include the conversion to polyalcohols by catalytic hydrogenation, the conversion to polypyrroles by reaction with primary amines or ammonia, the conversion to polyamines or polythiols by catalytic hydrogenation in the presence of ammonia or hydrogen sulphide respectively, the conversion to polyphenols by condensation with phenols, and the conversion to polyketals by reaction with alcohols.

The applicant has carried out an investigation into the methods for preparation of polyketone polymers with a low average molecular weight. Initially, fractionation was tried as a means to separate a low molecular weight fraction from the material prepared in the conventional manner and having a number average molecular weight of more than 10,000. Apart from the fact that this separation method was very time consuming, it produced only a very low yield of the desired low molecular weight material. Carrying out the polymerization at very high temperatures was also rejected as unattractive, since this manner of processing has a very unfavorable influence on the stability of the catalyst composition.

It was determined that the presence of hydrogen in the polymerization reactor could lead to the desired goal. The initial results from the use of catalyst compositions containing a tetraarylbisphosphine as bidentate ligand were disappointing. Although it was possible in this way to achieve some reduction in the average molecular weight, the prepared polymers still possessed a $\overline{M}_n$ which was considerably higher than 10,000. It was, however, found that the presence of hydrogen has a very strong lowering effect on the average molecular weight of the prepared polymers if the polymerization is carried out using a catalyst composition containing a tetraalkylbisphosphine as bidentate ligand. In this way it was possible to prepare polymers with a $\overline{M}_n$ of less than 2500 in a high yield.

Upon further investigation, it has now been surprisingly found that when using catalyst compositions containing a Group VIII metal and a tetra(sec-alkyl)bisphosphine, the desired polymers with a low molecular weight can also be prepared in the absence of hydrogen in the polymerization reactor. A tetra(sec-alkyl)bisphosphine, in which the carbon atoms forming part of the alkyl groups and linked to phosphorus are attached to two carbon atoms and only one hydrogen atom, was incorporated in the catalyst composition. By using such catalyst compositions, it was possible to prepare polymers in high yield with a $\overline{M}_n$ of less than 2500, in the absence of hydrogen.

SUMMARY OF THE INVENTION

The present invention provides a process for the preparation of polymers wherein polymers of carbon monoxide with one or more α-olefins are prepared by contacting the monomers in the presence of hydrogen with a catalyst composition containing a Group VIII metal and a tetra(sec-alkyl)bisphosphine bidentate ligand of the general formula

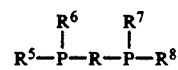

in which $R^5$, $R^6$, $R^7$, and $R^8$ each represent identical or different monovalent aliphatic hydrocarbon groups and in each group the carbon atom linked to the phosphorus atom is attached to two carbon atoms and only one hydrogen atom, and R is a divalent organic bridging group containing at least two carbon atoms in the bridge connecting the two phosphorus atoms to each other. In particular, the invention provides such a process wherein the polymerization reaction occurs in the absence of hydrogen, and the number average molecular weight of the polymer product is less than about 2500.

The invention further relates to the low molecular weight polymers thus prepared and to shaped objects consisting at least partly of these polymers.

DESCRIPTION OF THE INVENTION

Processes for the production of the linear alternating polyketone polymers typically involve the use of a catalyst composition formed from a compound of a Group VIII metal, a bidentate ligand of phosphorus, and the anion of a strong acid. In the investigation into preparing linear alternating polyketone polymers with a reduced number average molecular weight, it has been determined that the use of a particular type of phosphorus bidentate ligand has a significant effect on the number average molecular weight of the polymer product. If the polymerization is carried out in the presence of a tetra(sec-alkyl)bisphosphine bidentate ligand, preparation of polymer with a number average molecular weight of less than about 2500 will result. Consequently, the process of making low molecular weight polyketon polymers is carried out in the presence of a tetra(sec-alky )bisphosphine bidentate ligand.

The phosphorus bidentate ligands of the general formula

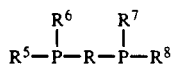

are suitable for use in the catalyst compositions of this invention. The groups $R^5$, $R^6$, $R^7$, and $R^8$ each represent identical or different monovalent aliphatic hydrocarbon groups, and in each group the carbon atom linked to the phosphorus atom is attached to two carbon atoms and only one hydrogen atom. The group $R^5$, $R^6$, $R^7$, and $R^8$ each preferably contain not more than 6 carbon atoms. Phosphorus bidentate ligands in which the groups $R^5$, $R^6$, $R^7$, and $R^8$ are the same as one another are preferred. Examples of suitable groups include 2-propyl, 2-butyl, and 2-pentyl groups. R is a divalent aliphatic bridging group of up to six carbon atoms containing from two to four carbon atoms in the bridge connecting the two phosphorus atoms to each other. There is preference for bridging groups containing three carbon atoms in the bridge. Examples of suitable bridging groups R are the $-CH_2CH_2CH_2-$ group and the $-CH_2C(CH_3)_2CH_2-$ group. A very suitable phosphorus bidentate ligand is 1,3-bis(di-2-propylphosphino)-propane and 1,3-bis(di-2-butyl-phosphino)propane. The phosphorus bidentate ligands in the catalyst compositions are used in a quantity of from about 0.5 to about 2 moles per mole Group VIII metal and preferably from about 0.75 to about 1.5 moles per mole Group VIII metal.

In the catalyst compositions according to the invention, Group VIII metals are understood to be the noble metals ruthenium, rhodium, palladium, osmium, iridium and platinum, as well as the iron group metals iron, cobalt and nickel. The Group VIII metal is preferably selected from palladium, nickel and cobalt. Palladium is particularly preferred as Group VIII metal. The incorporation of the Group VIII metal in the catalyst compositions preferably takes place in the form of a salt of a carboxylic acid, in particular in the form of an acetate.

In addition to a phosphorus bidentate ligand and a Group VIII metal, the catalyst compositions used in the polymer preparation according to the invention optionally also contain an anion of an acid with a pKa of less than 4 and in particular an anion of an acid with a pKa of less than 2. Examples of acids with a pKa of less than 2 are mineral acids such as perchloric acid, sulphonic acids such as para-toluenesulphonic acid and trifluoromethanesulphonic acid and halocarboxylic acids such as trifluoroacetic acid. There is preference for a halocarboxylic acid such as trifluoroacetic acid. The incorporation of the anion of an acid with a pKa of less than 4 in the catalyst composition can take place in the form of an acid and/or in the form of a salt. A nickel salt such as nickel perchlorate is very suitable as a salt. The anion is present in the catalyst compositions in a quantity of from about 1 to about 100 moles per mole Group VIII metal and preferably from about 2 to about 50 moles per mole of Group VIII metal.

In addition to a Group VIII metal, a phosphorus bidentate ligand and optionally an anion of an acid with a pKa of less than 4, the catalyst compositions useful in the polymer preparation according to the invention preferably also contain an organic oxidizing agent. Examples of suitable organic oxidizing agents are 1,2- and 1,4-quinones, aliphatic nitrites such as butyl nitrite and aromatic nitro compounds such as nitrobenzene and 2,4-dinitrotoluene. 1,4-quinones are preferred, and in particular 1,4-benzoquinone and 1,4-naphthoquinone. The organic oxidizing agent is present in the catalyst compositions in a quantity of from about 5 to about 5000 moles per mole of Group VIII metal, and preferably from about 10 to about 1000 moles per mole of Group VIII metal.

If the process of the invention is employed for the preparation of polymers of carbon monoxide with ethene and/or propene and also with one or more other α-olefins, the latter α-olefins preferably contain fewer than 10 carbon atoms per molecule. The process of the invention is particularly important for the preparation of polymers of carbon monoxide with ethene and/or propene.

The preparation of the polymers according to the invention is preferably carried out in the presence of a liquid diluent. Polar liquids are preferably used as diluents. These liquids can be protic or aprotic. An example of a suitable protic liquid is methanol. Examples of suitable aprotic liquids are acetone and tetrahydrofuran. If desired, the polymerization can also be carried out in the gas phase. The polymer preparation can be carried out either batchwise or continuously.

The quantity of catalyst composition used in the preparation of the polymers can vary within wide limits. Per mole of olefinically unsaturated compound to be polymerized a quantity of catalyst composition is preferably used which contains from about $1 \times 10^{-7}$ to about $1 \times 10^{-3}$ moles Group VIII metal and most preferably from about $1 \times 10^{-6}$ to about $1 \times 10^{-4}$ moles Group VIII metal.

The preparation of the polymers is preferably carried out at a temperature of from about 20° C. to about 150° C. and a pressure of from about 2 to about 150 bar, and most preferably at a temperature of from about 30° C. to about 130° C. and a pressure of from about 5 to about 100 bar. The molar ratio of the olefinically unsaturated compounds relative to carbon monoxide is preferably from about 10:1 to about 1:10 and most preferably from about 5:1 to about 1:5.

The invention will now be illustrated with reference to the following Comparative Examples (not of the invention) and Illustrative Examples, which are not to be construed as limiting.

ILLUSTRATIVE EXAMPLE 1

A carbon monoxide/ethene copolymer was prepared as follows. Into a stirred autoclave with a volume of 250 ml a catalyst solution was introduced consisting of:
50 ml methanol,
0.1 mmol palladium acetate,
2 mmol trifluoroacetic acid, and
0.12 mmol 1,3-bis(di-2-propylphosphino)propane.

After forcing in 20 bar ethene and 30 bar carbon monoxide, the autoclave contents were brought to 70° C. After 5 hours, the polymerization was terminated by cooling to room temperature and releasing the pressure. The polymer was filtered off, washed with methanol and dried. 12.5 g copolymer with a $\overline{M}_n$ of 2200 was obtained.

ILLUSTRATIVE EXAMPLE 2

A carbon monoxide/ethene copolymer was prepared in substantially the same way as in Illustrative Example 1, but with the difference that the catalyst solution contained 0.12 mmol 1,3-bis(di- 2-butylphosphino)propane instead of 1,3-bis(di-2-propylphosphino)propane. 14 g copolymer with a $\overline{M}_n$ of 2000 was obtained.

COMPARATIVE EXAMPLE 1

A carbon monoxide/ethene copolymer was prepared in substantially the same way as in Illustrative Example 1, but with the difference that the catalyst solution contained 0.3 mmol trifluoromethanesulphonic acid instead of trifluoroacetic acid and 0.12 mmol 1,3-bis(di-n-butylphosphino)propane instead of 1,3-bis(di-2-propylphosphino)propane. 6 g copolymer with a $\overline{M}_n > 10,000$ was obtained.

COMPARATIVE EXAMPLE 2

A carbon monoxide/ethene copolymer was prepared as follows. Into a stirred autoclave with a volume of 250 ml a catalyst solution was introduced consisting of:
40 ml tetrahydrofuran,
0.1 mmol palladium acetate,
0.3 mmol trifluoromethanesulphonic acid, and
0.2 mmol 1,3-bis(di-n-butylphosphino)propane.

After successively forcing in 25 bar carbon monoxide, 20 bar ethene and 25 bar hydrogen, the autoclave contents were brought to 80° C. After 5 hours the polymerization was terminated by cooling the reaction mixture to room temperature and releasing the pressure. The polymer was filtered off, washed with methanol and dried. 10.5 g copolymer was obtained with a $\overline{M}_n$ of 1400.

According to the Illustrative Examples, using catalyst compositions containing as phosphorus bidentate ligand a tetra(sec-alkyl)bisphosphine, polymers of carbon monoxide with ethene were prepared with a $\overline{M}_n < 2500$. Comparative Example 1 shows that if the polymerization is carried out using a catalyst composition containing a tetra(n-alkyl)bisphosphine, polymers with a very high average molecular weight are obtained. Comparative Example 2 demonstrates that if the polymerization is carried out using a catalyst composition containing a tetra(n-alkyl)bisphosphine, the presence of hydrogen has a strong lowering effect on the average molecular weight of the prepared polymers.

It was established by NMR analysis that the polymers prepared according to Examples 1-4 were built up of linear chains in which the units from carbon monoxide and the units from ethene occurred in an alternating arrangement.

I claim:

1. In the process of producing a low molecular weight linear alternating polymer of carbon monoxide and at least one α-olefin, wherein the polymer product has a number average molecular weight of less than about 2500, by contacting the carbon monoxide and α-olefin in a reactor under polymerization conditions in the presence of a liquid diluent and a catalyst composition formed from a palladium salt, the anion of an acid with a pKa of less than four, and a bidentate phosphine ligand, the improvement comprising contacting in the absence of hydrogen, and wherein the bidentate ligand is of the formula

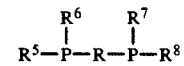

wherein $R^5$, $R^6$, $R^7$, and $R^8$ each represent identical of different monovalent aliphatic hydrocarbon groups in which the carbon atom linked to the phosphorus atom is attached to two carbon atoms and only one hydrogen atom, and wherein R is a divalent aliphatic bridging group of up to six carbon atoms and contains from two to four carbon atoms in the ridge connecting the two phosphorus atoms to each other.

2. The process of claim 1 wherein in the bidentate ligand, each of $R^5$, $R^6$, $R^7$, and $R^8$ contain less than six carbon atoms.

3. The process of claim 1 wherein in the bidentate ligand, each of $R^5$, $R^6$, $R^7$, and $R^8$ is selected from the group consisting of 2-propyl, 2-butyl, and 2-pentyl.

4. The process of claim 1 wherein in the bidentate ligand, each of $R^5$, $R^6$, $R^7$, and $R^8$ is the same.

5. The process of claim 1 wherein the bidentate ligand is 1,3-bis(di-2-propylphosphino)propane or 1,3-bis(di-2-butylphosphino)propane.

6. The process of claim 3 wherein in the bidentate ligand, R contains three carbon atoms in the bridge.

7. In the process of producing a low molecular weight linear alternating polyketone polymer of carbon monoxide and ethene, with or without propene, wherein the polymer product has a number average molecular weight of less than about 2500, by contacting the carbon monoxide and α-olefin in a reactor under polymerization conditions in the presence of a liquid diluent and a catalyst composition formed from a palladium salt, the anion of an acid with a pKa of less than four, and a bidentate phosphine ligand, the improvement comprising contacting in the absence of hydrogen, and wherein the bidentate ligand is of the formula

wherein $R^5$, $R^6$, $R^7$, and $R^8$ each represent identical or different monovalent aliphatic hydrocarbon groups in which the carbon atom linked to the phosphorus atom is attached to two carbon atoms and only one hydrogen atom, and wherein R is a divalent aliphatic bridging group of up to six carbon atoms and containing from two to four carbon atoms in the bridge connecting the two phosphorus atoms to each other.

8. The process of claim 7 wherein in the bidentate ligand, each of $R^5$, $R^6$, $R^7$, and $R^8$ contain less than six carbon atoms.

9. The process of claim 7 wherein in the bidentate ligand, each of $R^5$, $R^6$, $R^7$, and $R^8$ is selected from the group consisting of 2-propyl, 2-butyl, and 2-pentyl.

10. The process of claim 7 wherein in the bidentate ligand, each of $R^5$, $R^6$, $R^7$, and $R^8$ is the same.

11. The process of claim 7 wherein the bidentate ligand is 1,3-bis(di-2-propylphosphino)propane or 1,3-bis(di-2-butylphosphino)propane.

12. The process of claim 9 wherein in the bidentate ligand, R contains three carbon atoms in the bridge.

* * * * *